Patented Sept. 10, 1940

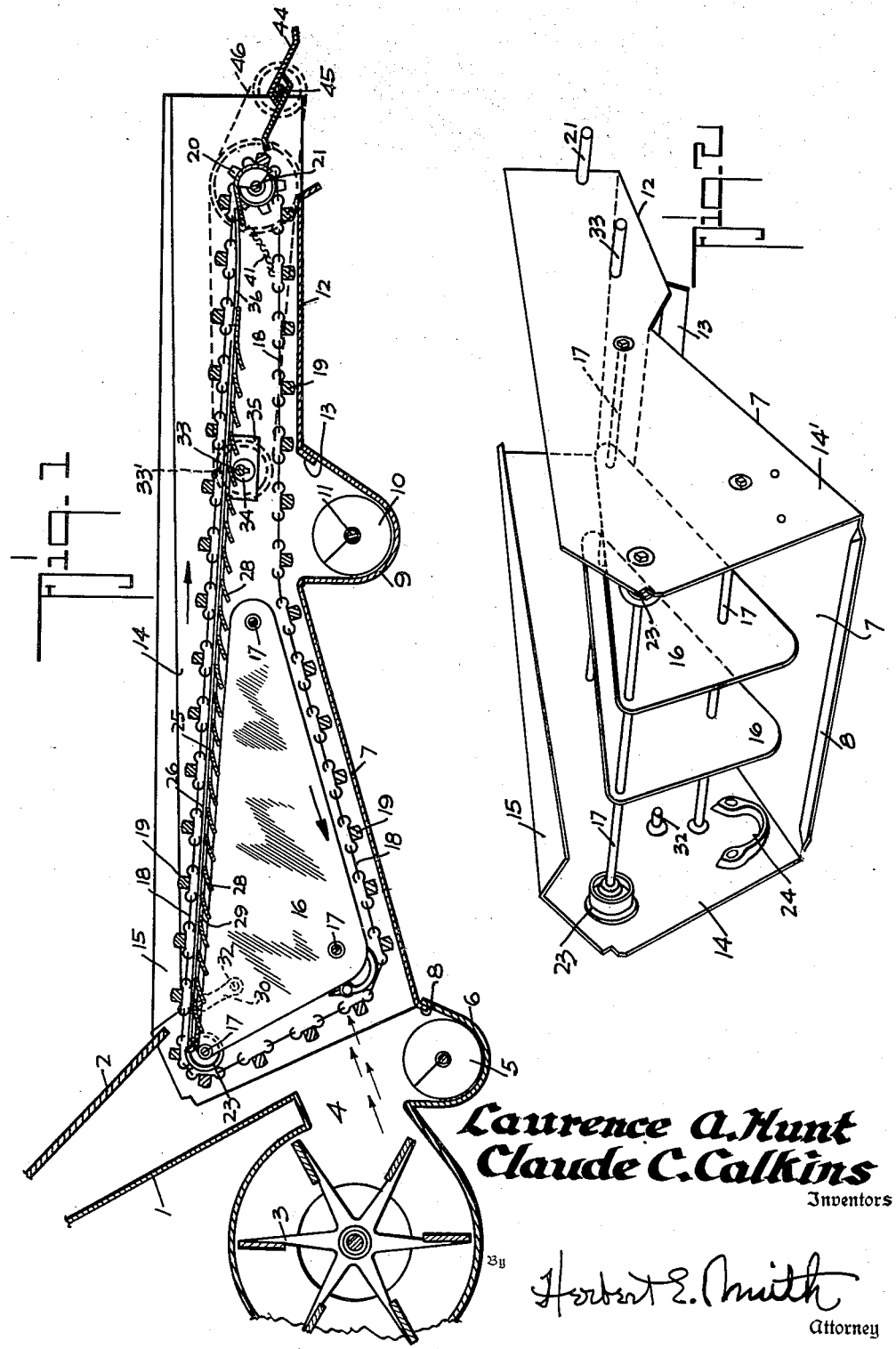

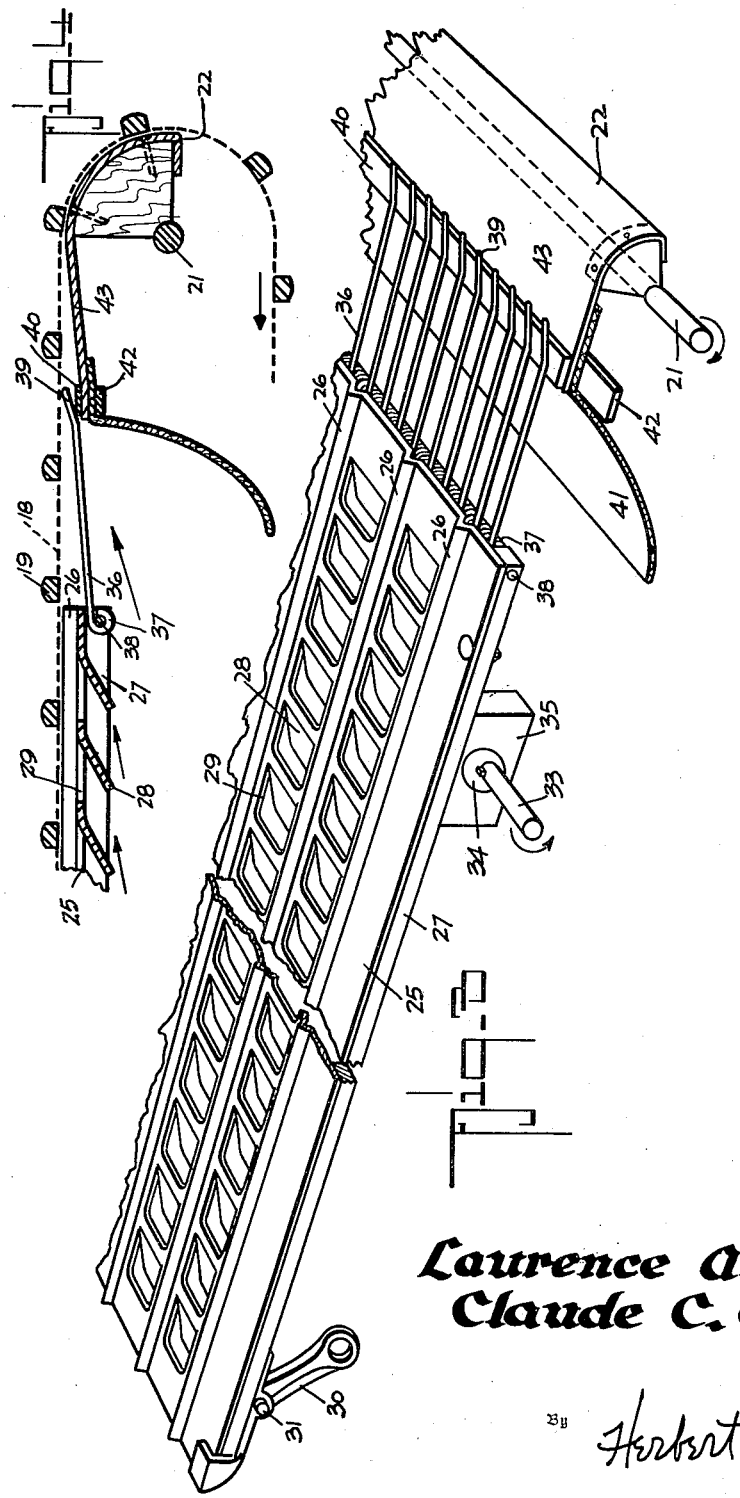

2,214,277

UNITED STATES PATENT OFFICE 2,214,277

GRAIN SEPARATOR

Laurence A. Hunt and Claude C. Calkins, Spokane, Wash., assignors to Calkins Manufacturing Company, Spokane, Wash., a corporation Application February 15, 1938, Serial No. 190,608

3 Claims. (Cl. 209—26)

The present invention relates to an improved grain separator for use in harvester-threshers, combines, and similar implements in separating weeds, chaff, straw, and other undesirable materials from the grain seed, by the employment of an endless conveyer or carrier, screen, and currents of air from a fan or blower. The improvements consist in an interior attachment, which may be substituted for well known types of agitators or reciprocating separators found in existing agricultural implements; and the substitution may be effected in existing implements without material change or alteration in the interior construction and operation of the implement.

The grain separator of our invention is especially useful when the implement is traveling and operating along a hill-side and consequently is not level but is tilted down-hill. Under such conditions the efficiency of the usual grain separator is impaired, but on the other hand with the subject matter of our invention incorporated in the interior of the threshing portion of the implement, the separation of grain is accomplished with efficiency.

The invention consists essentially in certain novel combinations and arrangements of parts to insure a compact interior attachment that may with convenience be assembled and installed for use, and which is simple in construction and operation, and by means of which an unusually high percentage of grain seed is separated and collected. In the accompanying drawings we have illustrated one complete example of the physical embodiment of our invention in which the parts are combined and arranged according to one mode we have thus far devised for the practical application of the principles of our invention.

Figure 1 is a vertical longitudinal sectional view of the separator in position within the interior of a thresher.

Figure 2 is a perspective view of the frame or support for the operating parts of the grain separator.

Figure 3 is a perspective view, partly broken away showing the agitator or screen and related parts.

Figure 4 is an enlarged vertical sectional view longitudinally of the separator, and showing the arrangement of parts at the rear end of the endless carrier.

In the assembly view of Figure 1 we have shown a portion of the usual housing 1 for the threshing portion of the harvester-thresher or combine, with the feed board 2 or bridge 2 extending transversely of the housing and the implement, for feeding material to the separator. At the front lower portion of the housing a conventional fan blower 3 is located and adapted to direct air currents through the throat 4 toward the rear end of the separator for the separation of the lighter chaff from the grain, and the latter, falling from the separator, is collected and conveyed by the transversely arranged screw conveyer 5 in its trough 6, to the exterior of the implement for further handling. In the operation of the separator, practically all of the clean grain seed is collected in the main conveyer 5 at the forward or front end of the separator, while an auxiliary screw conveyer 10 to be described is utilized in collecting the grain seed that is accompanied with or mixed in with weed seed and other chaff.

In the installation of the separating or threshing unit we employ a frame structure for the support of the operating parts, which frame is fixed in suitable manner within the interior of the housing 1 of the implement, and comprises an inclined bottom 7 rising from the throat 4 and the screw conveyer 5. The bottom terminates at its front end in a lip 8 that overhangs the wall of the trough 6, and it will be apparent that the separated, clean grain slides down the inclined bottom 7, passing beneath the air currents entering through the throat 4 as indicated by the arrows in Figure 1. At the upper end of this main delivery floor 7, another transversely arranged trough 9 is provided in the bottom of the frame, and this trough encloses the auxiliary screw conveyer 10 and its shaft 11, which trough collects the remaining grain seed, together with some weed seed, that are separated at the rear end of the separator. These separated seeds are scraped along the horizontal bottom portion 12 of the frame, to the left in Figure 1, and deposited in the trough 9.

As indicated in Figure 1, the rear or discharge end of the frame is fashioned with a transversely extending bottom flange 13 to aid in the discharge of trash, and as indicated in the perspective view of Figure 2, the side walls 14 and 14' of the frame are fashioned with inturned overhanging flanges 15 that protect the endless conveyer or carrier from accumulations of trash.

Between the two side walls 14 14' of the frame are arranged a plurality of spaced, upright plates or partitions 16, here shown as two in number, which partitions, at their front edges terminate adjacent the throat 4 through which the air currents from the blower 3, pass into the separator. These partitions divide the air blast from the blower into separated currents of air that are equally distributed, regardless of whether or not the separator is in level position, and the air currents are thus evenly distributed through the separator. Thus, as the straw, grain, and chaff, naturally drift toward the lowest portion of the separator, the effect of the separated and evenly distributed air currents is to elevate the straw and chaff through the entire area of the separator, to enhance the separating operation of the grain therefrom, even through the implement is traveling while in inclined position on a hillside.

These plates or partitions, it will be noted are supported on cross bars 17 extendng between the two walls 14 and 14', and the lower edges of the plates terminate at an elevation above the inclined floor 7 of the separator frame.

The material fed to the separator from the board or bridge 2 is deposited on an endless conveyer or carrier that includes the spaced chains 18, 18, and the crossed slats or sticks 19, the upper or carrier flight of the conveyer passing from left to right in Figure 1, and carrying with it the straw and chaff from which the grain seed are separated. The endless conveyer is operated through the use of sprockets or drive gears 20 on the shaft 21 journaled at the rear of the separator, and at its discharge end the carrier passes over and around a semi-cylindrical, fixed guide 22 mounted transversely of the frame. The chains 18 glide along beneath the overhanging guards or flanges 15, around the guide rolls 23 journaled at the feed end of the separator on one of the bars 17, and also around the lower semi-circular or U-shaped guides 24 attached at the inner sides of the side walls 14 and 14'. The endless conveyer is not taut, but somewhat loose and flexible in order that the upper carrying-flight, extending from the rolls 23 to the rounded guide 22, may be elevated and dropped with an undulating motion, and also to permit the slats 19 to scrape along the bottom portion 12 for the purpose of passing separated grain seed and some chaff to the auxiliary conveyer 10.

This undulating motion of the carrier-flight of the conveyer is accomplished through the use of an agitator screen that rises and falls continuously, with a rearward working stroke that assists in conveying the material from left to right in Figure 1, and also enhances the threshing operation by tossing the material to permit separation of the grain therefrom.

The agitator screen as shown includes a metal plate 25 preferably provided with longitudinally extending ribs or ridges 26 on its top surface, to reinforce the screen and to cause the material to move in confined channels, and along the undersides of the edges of the rectangular plate are mounted edge rails 27. The body of the plate, between the adjoining ribs is fashioned with downturned tongues 28 that decline toward the front of the separator, and these tongues are formed by punching holes or slots 29 in the plate to permit flow of grain through the screen and the grain is directed toward the main screw conveyer 5 or the auxiliary screw conveyer 10 as the case may be.

The screen or agitator is supported beneath the carrier-flight of the endless conveyer in position so that the chains 18 may glide along the top surfaces of the plate 25 at its lateral edges, and thus the carrier-flight is sustained in substantially straight line, with a slight declination to the rear or discharge end of the separator.

At its front end the agitator screen is pivotally supported in hangers or arms 30 by the pins 31, and these arms are pivotally supported at their lower ends on studs or pins 32 mounted in the side walls 14 and 14' of the frame.

The rear or discharge end of the agitator-screen is supported in such manner as to permit the imparting thereto of a rising and falling movement that extends throughout the length of the agitator-screen and effects the undulating movement of the endless conveyer or carrier-flight of the conveyer. This undulating movement is accomplished through the instrumentality of a rotary shaft 33 extending transversely of the separator and journaled in suitable bearings, and as indicated in Figure 1 the shaft 33 is operated through suitable gearing 33' from the drive shaft 21. A pair of spaced eccentric disks, as 34 are keyed on the shaft 33 and these disks co-act with the eccentric bearing blocks 35 fixed to the undersides of the two side rails 27 of the agitator screen, in order that the agitator may be operated as the shaft 33 turns in the direction of the arrow in Figure 3.

The screen or sieve is thus suspended and supported at the front by the pivotally mounted, oscillatable arms 30 which insure the necessary freedom of movement of the screen for tossing the material in the air and toward the rear end of the screen. At its rear end the screen or sieve is supported by the eccentrics 34 in the bearing blocks 35 that are rigid with the screen and while the eccentrics "shuffle" the screen, they cannot excessively lift the rear end of the screen because of the direct relation of the blocks to the screen; thus the eccentric action of the screen limits the freedom of upward movement of the rear end of the screen that would otherwise, under some conditions, retard the forward movement of the material.

The oscillating movement of the arms 30 constantly lifts the chaff and grain from the sieve to permit the air blasts or currents of air to pass through openings 29 and assist in conveying the material toward the rear and at the same time permit of separation of the grain from the chaff.

The carrier flight of the endless conveyer also assists in conveying the material, especially when the harvester is going down-hill. When the machine is traveling uphill, the lower flight of the endless conveyer, is especially adapted to pass over the floor 7 and the bottom 12 and convey the grain to the transverse conveyers.

Through this threshing effect of the endless carrier and the agitator screen, substantially all of the grain is separated and drops from the screen, before it can reach the discharge end of the screen, and at this end of the screen, the straw and remaining chaff are passed onto a series of spaced tines 36 that form a longitudinal extension of the agitator screen. These tines, with their springs 37, are mounted on a transversely extending rod or bar 38 having its opposite ends supported in and at the ends of the rails 27 of the agitator screen, and the free up-turned ends 39 of the laterally spaced tines rest upon, at all times, on a cross bar 40 which bar is rigid with the rounded guide 22.

These spaced tines provide for flow of air currents at the rear end of the agitator, and a deflector 41, which may be fashioned of canvas, directs the air currents upwardly through the spaces between the tines for facilitating the discharge of the straw and chaff from the rear end of the separator.

The canvas deflector, and the wear-bar 40 that supports the free ends of the spring tines, as well as an apron-portion 43 of the rounded guide 22, are supported on a transversely extending angle iron bar 42 mounted between the side walls of the separator frame.

The canvas deflector also deflects the separarated grain and other seeds that may fall through the spaces between the tines, and these seeds are passed to the auxiliary conveyer 10, being kept separate from the high-grade grain seed that is handled by the main screw conveyer 5.

After separation of the seeds and grain, the remaining straw and chaff are conveyed by the carrier-flight, as it rounds the guide 22, and discharged in the path of a rotary straw "kicker" 45 that is driven by the gearing shown in dotted lines at 46 in Figure 1, from the drive shaft 21.

The apron 43, which merges with the rounded guide 22, it will be noted, prevents straw and chaff from dropping or falling through the carrier-flight of the endless conveyer, and by this use of the apron and the guide, trash is prevented from becoming entangled in the conveyer after it passes under the guide 22.

The two stages in the separation process, as by the use of the main conveyer 5 and the auxiliary conveyer 10, enhance the threshing process in that the clean grain handled by the main conveyer does not require further separation; and the auxiliary conveyer takes care of and handles a small quantity of seed that requires further separating steps for the final recovery of the grain seed, the material from the conveyer being again run through the cylinder.

Having thus fully described our invention, what we claim as new and desire to secure by Letters Patent is:

1. In a grain separater, the combination with a frame and an endless conveyer mounted therein, of an agitator screen located beneath the carrier-flight of the conveyer, a pair of arms pivotally mounted in the frame and pivotally supporting the feed-end of the screen, and eccentric means mounted in the frame and having bearings on the screen adjacent the discharge end, and means for rotating said eccentric means.

2. A grain separator comprising a housing frame, an endless conveyer mounted therein, means for operating said endless conveyer, an agitator screen located beneath the carrier-flight of said conveyer, oscillatable arms mounted in the frame and pivotally attached to the feed end of said screen, a rotatable shaft mounted in said housing transversely thereof, adjacent and beneath the discharge end of the screen, eccentric members on said rotatable shaft, bearing blocks secured to the lower side edges of said screen and engaging said eccentric members, and means for rotating said shaft and eccentric members.

3. A grain separator comprising a housing frame, an endless conveyer mounted therein, a fixed rounded guide for the discharge end of the carrier-flight of said endless conveyer supporting a depending apron, an agitator screen located beneath the carrier-flight of said conveyer, oscillatable arms mounted in the frame and pivotally attached to the feed end of said screen, eccentric means mounted in the frame and having bearings on the screen adjacent the discharge end, means for rotating said eccentric means, pivoted tines on the discharge end of the screen forming an extension thereof and having their outer ends resting upon the fixed rounded guide, a fan cooperating with said frame to produce a blast of air under said screen and said pivoted tines.

CLAUDE C. CALKINS.
LAURENCE A. HUNT.